UNITED STATES PATENT OFFICE.

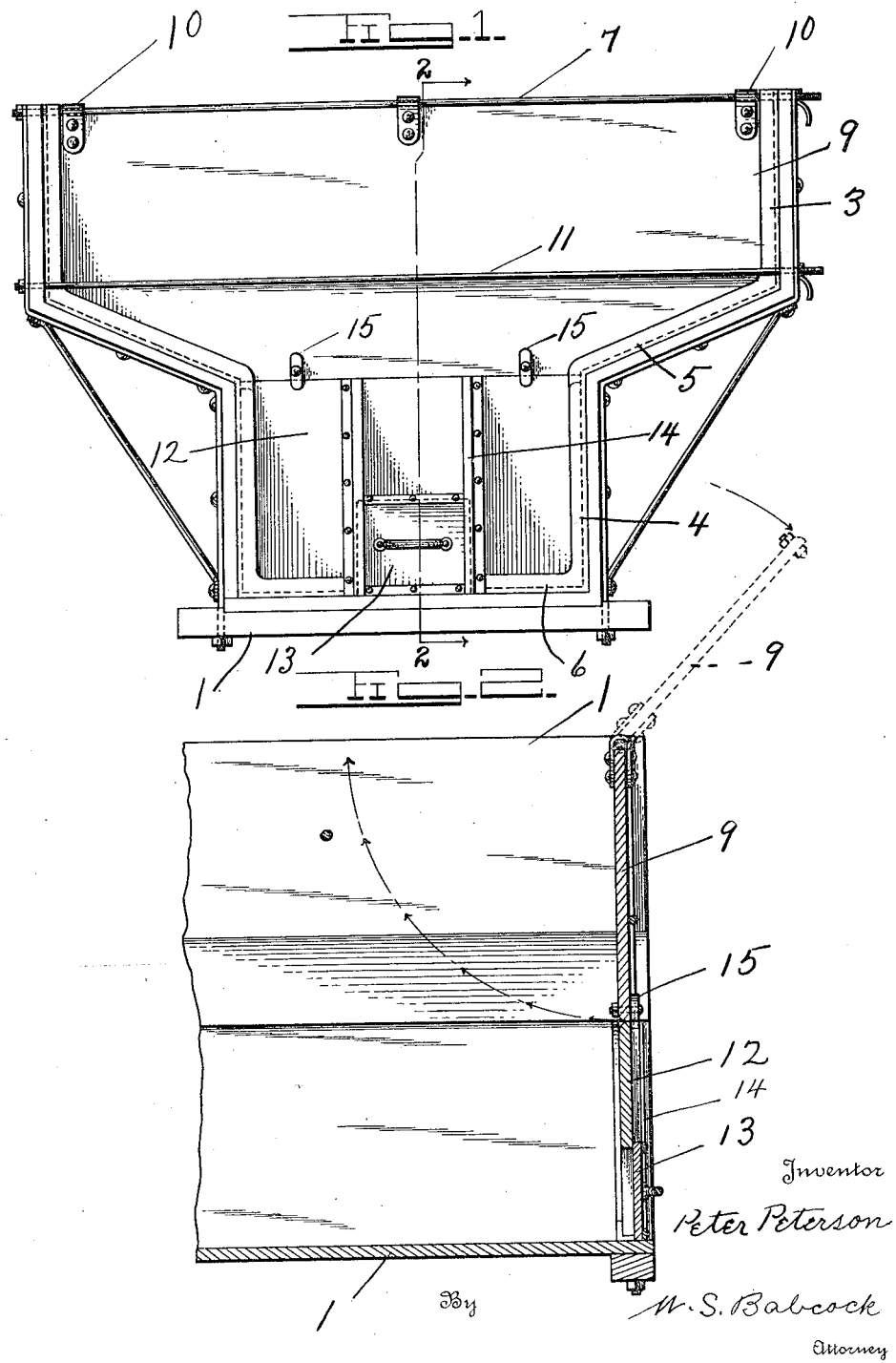

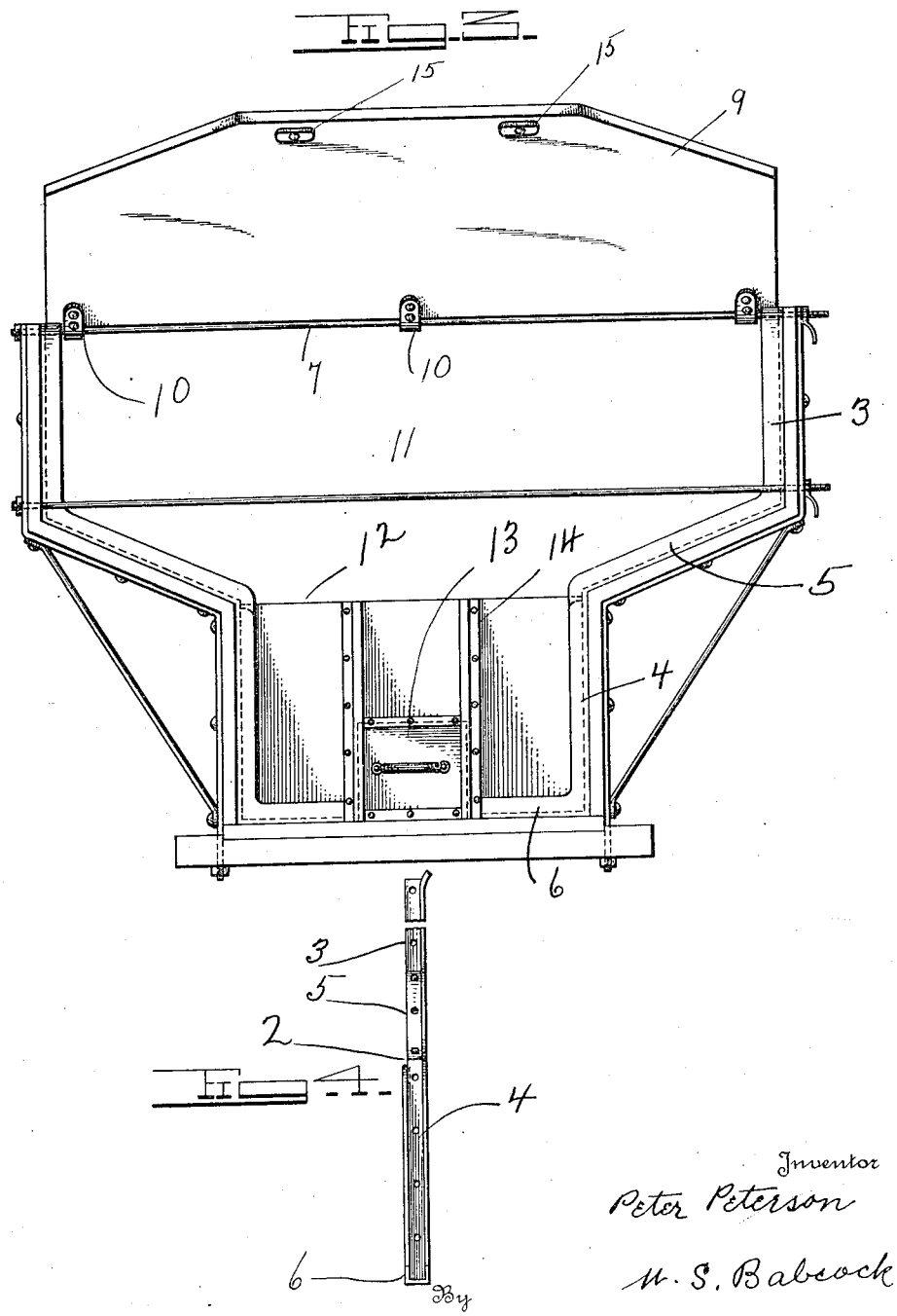

PETER PETERSON, OF NEAR STAVELY, ALBERTA, CANADA, ASSIGNOR OF ONE-HALF TO WILLIAM MUCKENHIRR, OF STAVELY, ALBERTA, CANADA.

END-GATE FOR GRAIN TANK WAGONS.

1,224,319.                Specification of Letters Patent.      Patented May 1, 1917.

Application filed May 9, 1916. Serial No. 96,457.

*To all whom it may concern:*

Be it known that I, PETER PETERSON, a subject of the King of Great Britain, residing near the town of Stavely, in the Province of Alberta, Dominion of Canada, have invented new and useful Improvements in End-Gates for Grain Tank-Wagons, of which the following is a specification.

The invention to be hereinafter described relates to end gates for grain tank wagons.

In order to more clearly disclose the construction, operation, and use of the invention, reference should be had to the accompanying drawings forming part of the present application. Throughout the drawings like reference characters designate the same parts.

In the drawings:—

Figure 1 is a rear end elevation, with the gate closed;

Fig. 2 is a vertical cross section on line 2—2 of Fig. 1;

Fig. 3 is a view similar to Fig. 1, with the upper section swung open; and,

Fig. 4 is an end view of one of the channel iron guide and stop plates.

The main objects of the invention are to provide a simple, efficient, economical, durable, and compact grain tank wagon end gate which will greatly facilitate loading.

Referring to the drawings in detail, 1 indicates the wagon body. Combination guide and stop irons 2 are secured to the inner walls of the body near the rear end and each comprises an upper and lower vertical branch 3 and 4, respectively, an intermediate inclined connecting branch 5, and a lower horizontal branch 6, extending inwardly at right angles to the lower vertical branch 4. The branches 3 and 5 are of plain L shape in cross section, while the branches 4 and 6 are of channel or U shape in cross section, for purposes to be later disclosed. This particular shape is to enable them to exactly fit the wagon body walls. Across the upper part of the wagon body extends a rod 7 the opposite ends of which may be threaded and provided with tightening nuts, one of the nuts being provided with a lever handle to assist in the tightening. From the rod 7 is pivotally swung or suspended an upper end gate section 9, cut to fit the upper vertical and intermediate inclined walls of the wagon body, when in the closed position of Fig. 1. Small metal straps 10, or the like devices serve to pivotally suspend the gate section 9 from its rod 7. When the upper section 9 is swung to the closed position of Fig. 1, its rear face will fit snug against the vertical wall of the branches 3 and 5 which thus act as a solid and rigid stop for it and prevent it from swinging rearwardly beyond its vertical or closed position. To further brace and strengthen it against the load strains, a second rod 11 is used. It is similar in all respects to rod 7 but lies directly in the rear of gate section 9 and just above the upper end of the inclined wall of the wagon body. This, also, effectually limits the rearward swing of the gate section 9, beyond the vertical position. Slidably mounted in the channels of the branches 4 and 6 is the removable lower gate section 12 having a small central opening in its lower edge which is closed by a small door 13 traveling in the Z iron guide ways 14, extending vertically upward from the inner ends of the branches 6 of the guide and stop irons 2. With the lower section 12 in place and the upper section lowered, a complete tight end gate is provided. To prevent inward swing of the upper section, turn buttons 15 are provided. They are rotatably mounted on suitable pins or the like near the lower edge of section 9 and on its rear face, in such position that they may overlap and engage the rear face of the lower section 12, thus practically locking the two sections together. Thus, when the parts are in the positions of Fig. 1 the rear end of the wagon body is completely closed. It may be partly opened by either raising the slide door 13 in its vertical guides, or by swinging section 9 to the position of Fig. 3, or both. The rear end of the wagon body may be entirely opened by swinging section 9 to the position of Fig. 3 and also raising section 12 vertically in its guides till entirely above the same and removing this latter section.

It is thought that the construction, operation, and use of the invention will be clear from the preceding detailed description.

Changes may be made in the construction, arrangement, and disposition of the several parts of the invention without in any way departing from the field and scope of the same and it is meant to include all such within this application wherein only a preferred form has been disclosed by way of illustration.

Having described my invention what I claim and desire to protect by Letters Patent is:—

1. In combination with the body of a vehicle for holding grain and other comminuted material, a pair of guide and stop irons fitted thereto, each iron comprising an upper part which is L-shaped in cross-section and a lower part which is U-shaped in cross-section, an upper gate section pivotally attached to said body but held by the L-shaped parts of said irons against turning outwardly from the position of closure, and a lower gate section which is guided vertically by the U-shaped parts of said irons and removable by raising it above the same.

2. In combination with the body of a vehicle, a pair of guide and stop irons attached to said body, each of said irons consisting of an upper part which is L-shaped in cross-section and a lower part which is U-shaped in cross-section and extended inwardly along a part of the bottom of the vehicle besides being arranged vertically along the proximate portion of its side, a vertically slidable gate section fitting into the U-shaped parts of the irons, both in the vertical and horizontal portions, an upper pivoted gate section turning outward against the L-shaped parts of said irons, by which it is stopped from turning farther outward, though free to turn inwardly.

3. In combination with guides at the sides of an opening, an upper grain-gate section movable independently to open and close the upper part of said opening, a lower grain-gate section normally closing the lower part of said opening but movable vertically in said guides and provided with an opening, and vertical guides at the sides thereof and a door vertically movable in the latter guides, the above mentioned devices permitting, as preferred, the opening of the entire gate, or of the upper section only, or of the small door only, or of the latter and the upper section, while leaving the greater part of the lower section closed.

4. An end gate comprising, a lower gate section provided with an opening through its lower edge, a door slidably mounted on said lower section and adapted to close the opening therethrough, means for maintaining said lower section in vertical position, an upper section, means for pivotally suspending the same, means for limiting the rearward swing of said upper section, and turn buttons carried by the rear of the upper section and adapted to engage the rear of the lower section to secure the upper section in closed position and prevent its forward swing.

Signed at Stavely, Alberta, Canada, this 25th day of April, 1916.

PETER PETERSON.